UNITED STATES PATENT OFFICE.

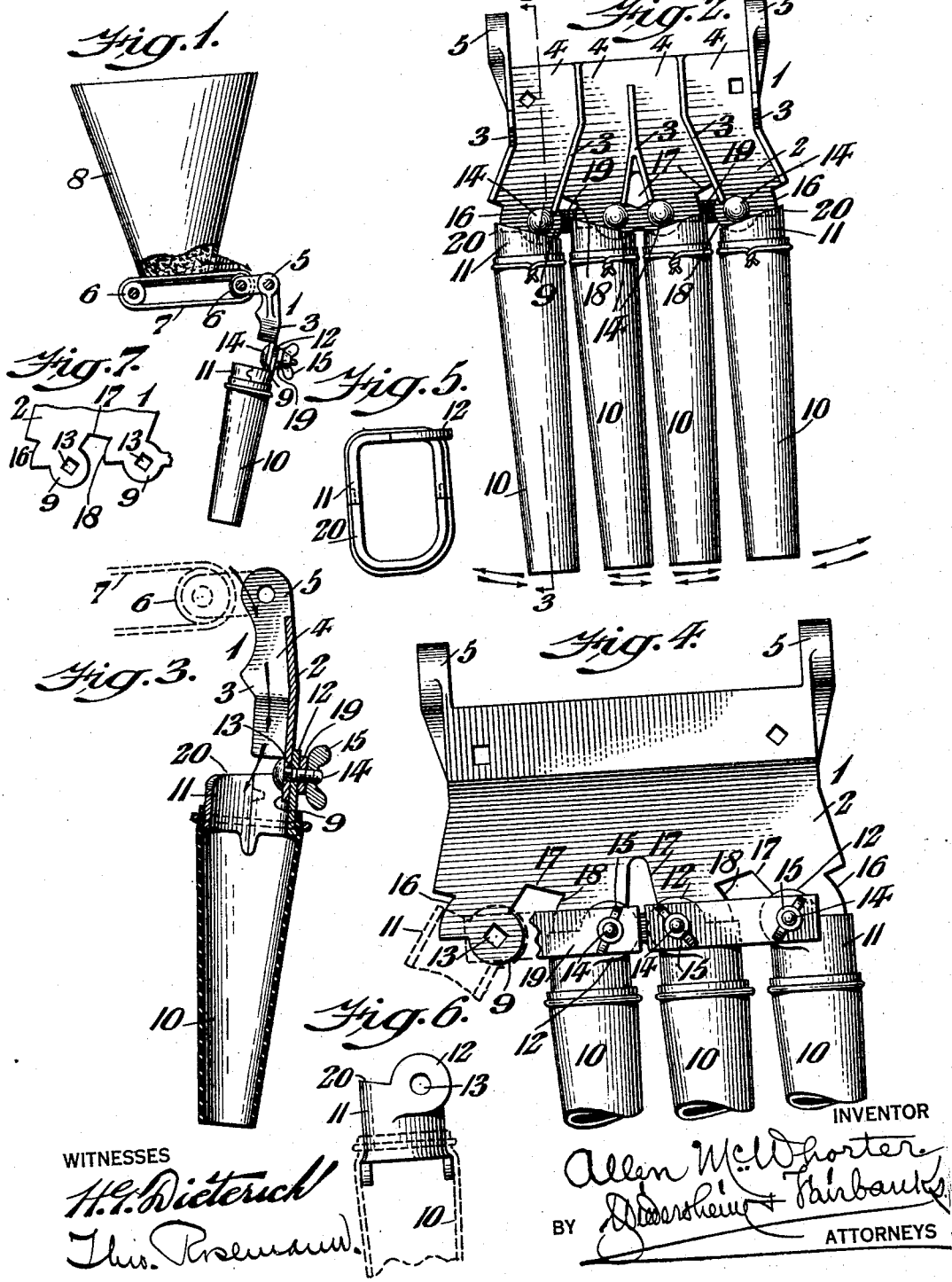

ALLEN McWHORTER, OF RIVERTON, NEW JERSEY.

FERTILIZER-DISTRIBUTER.

1,220,249.

Specification of Letters Patent. Patented Mar. 27, 1917.

Application filed October 11, 1916. Serial No. 124,981.

*To all whom it may concern:*

Be it known that I, ALLEN McWHORTER, a citizen of the United States, residing at Riverton, in the county of Burlington, State of New Jersey, have invented a new and useful Fertilizer-Distributer, of which the following is a specification.

My invention relates to a fertilizer distributer which is composed of a head to which the fertilizer is fed or supplied, and spouts which are pendant from said head and adjustable so as to distribute the fertilizer in right line directions from said head, or in laterally spread directions, and so over a greater width of surface.

The invention is satisfactorily illustrated in the accompanying drawing, but the important instrumentalities thereof may be varied, and so it is to be understood that the invention is not limited to the specific details shown and described.

Figure 1 represents a side elevation of a portion of a fertilizer embodying my invention.

Fig. 2 represents a side elevation at a right angle to Fig. 1, on an enlarged scale.

Fig. 3 represents a vertical section of a portion on line 3—3 Fig. 2.

Fig. 4 represents a side elevation of a portion opposite to Fig. 2.

Fig. 5 represents a top view of an inlet of a spout.

Fig. 6 represents an elevation of said inlet.

Fig. 7 represents an elevation of a portion of the lower end of the head of the device.

Similar numerals of reference indicate corresponding parts in the figures.

Referring to the drawings:—

1 designates a head which is composed of the comparatively flat plate 2 having on the inner side thereof the walls 3 which extend outwardly therefrom, forming the vertical passages 4 which are open throughout, the upper end of said plate being provided with ears 5 whereby it may be secured to a proper portion of the frame of the device and depend therefrom in inclined position.

On said frame adjacent to the inner side of the top of said plate are mounted the rollers 6 around which passes the endless apron 7, above which is supported on said frame, the supply hopper 8, whereby fertilizer is directed from the latter by said apron to the top of the head 1 and dropped into the passages 4.

It will be noticed that the walls 3 are partly perpendicular and partly deflected to the right and left, whereby the passages 4 follow the courses thereof.

On the lower end of the plate 2 are the ears 9 each of which is below the lower end of one of the passages 4 and placed at one side thereof, said ears 9, the walls 3, the ears 5 and the plate 2, being in the present instance an integral casting of metal.

10 designates tubular discharge spouts, which are preferably flexible in their nature, they being secured at the top to the tubular collars 11, each of which is provided with an eye 12 which projects upwardly from the collar at one side thereof, so as to be in a measure eccentric on the collar. The ears 9 and eyes 12 have openings 13 therethrough to receive the bolts 14 which serve to connect the collars 11, and consequently the spouts 10 with the head 1 and form axes for said spouts whereby the latter may be placed in perpendicular or laterally inclined positions, as shown in full and dotted lines Fig. 4.

The bolts 14 are provided with nuts 15 for tightening purposes to hold the spouts in their adjusted positions. The side edges of the lower portions of the plate 2 are cut away and made segmental as at 16 so that when the outer spouts turn in one direction the inner walls of the respective collars 11 ride on the segments and rest thereagainst as supports in the lateral adjusting motions of said spouts.

The bottom edge of the plate 2 has therein the recesses 17, the inner sides of the walls thereof are made segmental as at 18 so that the intermediate spouts 10 may have their collars ride on the segments similar to those of the outer spouts, and for similar purposes, the recesses 17 allowing the upper side portions of the collars of the intermediate spouts to enter the same in turning the latter respectively to the right and left and so ride on the segmental edges 18 of the plate.

Interposed between the nuts 15 and the eyes 12 of the collars 11 are the washer plates 19 which have the bolts 14 passed through the same, said plates being bridged from one bolt to the other so that while said plates act as washers for said nuts, they are prevented from turning and loosening as is evident.

Portions 20 of the collars 11 are extended upwardly above the bottom edge of the plate 2 of the head so as to prevent loss of the fertilizer as it runs from the lower ends of the passages 4 into said collars.

It will be seen that when the apron receives motion as it does from suitable members of the device, fertilizer from the hopper 8 is carried toward the head 1 and it is discharged therefrom into the passages 4 thereof and directed by the walls 3 and inclined plate 1 downwardly into the collars 11 and consequently into the spout from which latter it is distributed to the place of service. This may be accomplished by having the spouts placed parallel in perpendicular directions or by inclining the spouts laterally in inclined direction so as to spread the fertilizer, this according to requirements, it being noticed also that the eccentric connection of the spouts with the plate 2 allow considerable lateral motions of said spouts so as to permit considerable spreading of the same.

Having thus described my invention what I claim as new and desire to secure by Letters Patent, is:—

1. In a distributer of the character stated, a head connectible with the frame thereof, walls on a plate of said head forming with said plates vertical passages, discharge spouts in communication with the latter, bolts adapted to pivotally connect said spouts with said head, and a washer adapted to be fitted on said bolts, and extend from one bolt to the other and being thereby rendered non-rotatable.

2. In a distributer of the character stated, a head connectible with the frame thereof, walls on a plate of said head forming a vertical passage thereon, a tubular collar connected pivotally with said head and in communication with said passage, and a discharge spout attached to said collar and in communication therewith, said spout being adapted to be placed in perpendicular and laterally inclined directions.

3. In a distributer of the character stated, a head connectible with the frame thereof, a head connectible with the frame thereof, walls on a plate of said head forming a vertical passage thereon, a tubular collar in communication with said passage provided with an eye eccentric thereon, said eye being connected pivotally with said plate, and a discharge spout attached to said collar and in communication therewith.

4. In a distributer of the character stated, a head connectible with the frame thereof, a head connectible with a plate of said head forming a walls on a plate of said head forming a vertical passage thereon, a tubular collar having a pivotal connection with the lower portion of said plate and depending therefrom, and a discharge spout attached to said collar and depending therefrom, said end of the plate having segmental and recessed edges to permit play of said collar on said portion in the lateral adjustment of the collar.

5. In a distributer of the character stated, a head connectible with the frame thereof, walls on a plate of said head forming a vertical passage thereon, a tubular collar having a pivotal connection with the lower portion of said plate, and a discharge spout attached to said collar, said spout being adapted to move laterally on said portion of said plate and having its upper end extending above the lower edge of said plate.

6. In a distributer of the character stated, a head connectible with a frame thereof, a passage in said head, discharge spouts pendant from said head, bolts adapted to connect said spouts with said head and allow perpendicular and laterally inclined adjustments of said spouts, nuts on said bolts, and washer plates on said bolts adapted to be engaged by said nuts and being bridged from one bolt to the other.

ALLEN McWHORTER.

Witnesses:
GEO. W. ALBRIGHT,
W. A. HENDRICKSON.

Copies of this patent may be obtained for five cents each, by addressing the "Commissioner of Patents, Washington, D. C."